(12) United States Patent
Ferren

(10) Patent No.: US 8,154,647 B2
(45) Date of Patent: Apr. 10, 2012

(54) AUTOMATED EXTENDED DEPTH OF FIELD IMAGING APPARATUS AND METHOD

(75) Inventor: Bran Ferren, Beverly Hills, CA (US)

(73) Assignee: Applied Minds, LLC, Glendale, CA (US)

( * ) Notice: Subject to any disclaimer, the term of this patent is extended or adjusted under 35 U.S.C. 154(b) by 465 days.

(21) Appl. No.: 12/398,034

(22) Filed: Mar. 4, 2009

(65) Prior Publication Data

US 2009/0225199 A1   Sep. 10, 2009

Related U.S. Application Data

(60) Provisional application No. 61/034,088, filed on Mar. 5, 2008.

(51) Int. Cl.
*H04N 5/225* (2006.01)
*G02B 13/16* (2006.01)

(52) U.S. Cl. ......... 348/335; 348/340; 348/345; 348/348

(58) Field of Classification Search ................ 348/335, 348/340, 345, 348
See application file for complete search history.

(56) References Cited

U.S. PATENT DOCUMENTS

| 4,764,787 | A * | 8/1988 | Hamada et al. | 396/96 |
| 7,307,653 | B2 * | 12/2007 | Dutta | 348/208.7 |
| 7,565,074 | B2 * | 7/2009 | Nakahara | 396/125 |
| 2003/0023443 | A1 * | 1/2003 | Shizuka et al. | 704/260 |
| 2006/0245752 | A1 * | 11/2006 | Kawaguchi | 396/451 |
| 2007/0212056 | A1 * | 9/2007 | Nagata | 396/354 |
| 2008/0013941 | A1 * | 1/2008 | Daley | 396/121 |

OTHER PUBLICATIONS

Littlefield, Rik; "Extended Depth of Field Photography of Insects et al."; Aug. 7, 2005; retrieved online from website: http://www.janrik.net/insects/ExtendedDOF.
Hadley, Alan; "CombineZ5"; Jun. 2005; retrieved online from website: http://www.hadleyweb.pwp.blueyonder.co.uk/CZ5/combinez5.htm.
Wikipedia; "Depth of field"; publication date not provided; viewed online Feb. 2008; retrieved from website: http://en.wikipedia.org/wiki/Depth_of_field.
Kodak; *Close-up Photography and Photomacrography*; 1977; Kodak Publication N-12, p. 78.

* cited by examiner

*Primary Examiner* — Yogesh Aggarwal
(74) *Attorney, Agent, or Firm* — Michael A. Glenn; Glenn Patent Group

(57) ABSTRACT

An imaging apparatus and method enables an automated extended depth of field capability that automates and simplifies the process of creating extended depth of field images. An embodiment automates the acquisition of an image "stack" or sequence and stores metadata at the time of image acquisition that facilitates production of a composite image having an extended depth of field from at least a portion of the images in the acquired sequence. An embodiment allows a user to specify, either at the time of image capture or at the time the composite image is created, a range of distances that the user wishes to have in focus within the composite image. An embodiment provides an on-board capability to produce a composite, extended depth of field image from the image stack. One embodiment allows the user to import the image stack into an image-processing software application that produces the composite image.

28 Claims, 3 Drawing Sheets

AUTOMATED EXTENDED DEPTH OF FIELD IMAGING APPARATUS AND METHOD

CROSS REFERENCE TO RELATED APPLICATIONS

This Application claims benefit of U.S. provisional patent application Ser. No. 61/034,088, filed Mar. 5, 2008, which is incorporated herein in its entirety by this reference thereto.

BACKGROUND OF THE INVENTION

1. Field of the Invention

In general the invention relates to extending the depth of field in images. More particularly, the invention relates to an imaging apparatus, having an automated extended depth of field mode, and associated method.

2. Background Information

Obtaining sufficient depth of field is a constant challenge in photography, particularly when photographing at extremely close range or under low lighting conditions. Setting the lens to a small aperture yields more depth of field, but this technique is eventually limited by diffraction effects and may mandate excessively long exposure times. The traditional approach to this difficulty required the photographer to determine the optimum lens aperture for effecting the golden mean between stopping down the lens for depth of field and opening it up for good resolution. *Close-up Photography & Photomacrography* 78 (Kodak Technical Publication N-12, Eastman Kodak Co. 1977).

However, advances in image post-processing have enabled a new approach to this challenge. In extended depth of field (EDOF) photography, a photographer captures a stack of images, sweeping the focus distance of the lens through the range of interest in a stepwise fashion. Post-processing software then combines the stack images into a single composite image by selecting from each stack image the in-focus portion of the image. The resulting composite image thus provides both high resolution and a large depth of field. However, this technique requires the photographer to determine the depth of field provided by the lens and aperture, and to then manually advance the focus distance of the lens by the appropriate amount between acquisition of each stack image. This is both tedious and prone to error.

Software control programs are available that control camera systems to produce image stacks, wherein each image is taken at different focus points within the subject. However, the software programs run externally to the imaging apparatus, therefore requiring a separate computing apparatus, communicatively coupled to the imaging apparatus for executing the control software. Additionally, the task of mastering such control programs may be difficult and time-consuming. Furthermore, such programs are not widely available, typically being provided by manufacturers or VAR's (value-added resellers) for specific imaging apparatus.

Digital cameras having an automated focus bracketing feature are now available. In photography, "bracketing" is the general technique of taking several shots of the same subject using different camera settings. A camera having an automated focus bracketing capability takes a series of shots of a subject, automatically changing the focal distance after each shot. Typically, the photographer may choose from a number of settings that specify the number of shots. Such bracketing features do not embody automated intelligence for calculating the spacing of images in a stack for (EDOF) photography based on photographer-selected near and far focus limits.

SUMMARY

An imaging apparatus and method automates and simplifies the process of creating extended depth of field images. An embodiment automates the acquisition of an image stack and stores metadata at the time of image acquisition that facilitates production of a composite image having an extended depth of field from at least a portion of the images in the acquired stack. An embodiment allows a user to specify, either at the time of image capture or at the time the composite image is created, a range of distances that the user wishes to have in focus within the composite image. An embodiment provides an on-board capability to produce a composite, extended depth of field image from the image stack. An embodiment allows the user to import the image stack into an image-processing software application that produces the composite image.

DETAILED DESCRIPTION

An imaging apparatus and method automates and simplifies the process of creating extended depth of field images. An embodiment automates the acquisition of an image stack and stores metadata at the time of image acquisition that facilitates production of a composite image having an extended depth of field from at least a portion of the images in the acquired stack. An embodiment allows a user to specify, either at the time of image capture or at the time the composite image is created, a range of distances that the user wishes to have in focus within the composite image. An embodiment provides an on-board capability to produce a composite, extended depth of field image from the image stack. An embodiment allows the user to import the image stack into an image-processing software application that produces the composite image.

Figure 1:
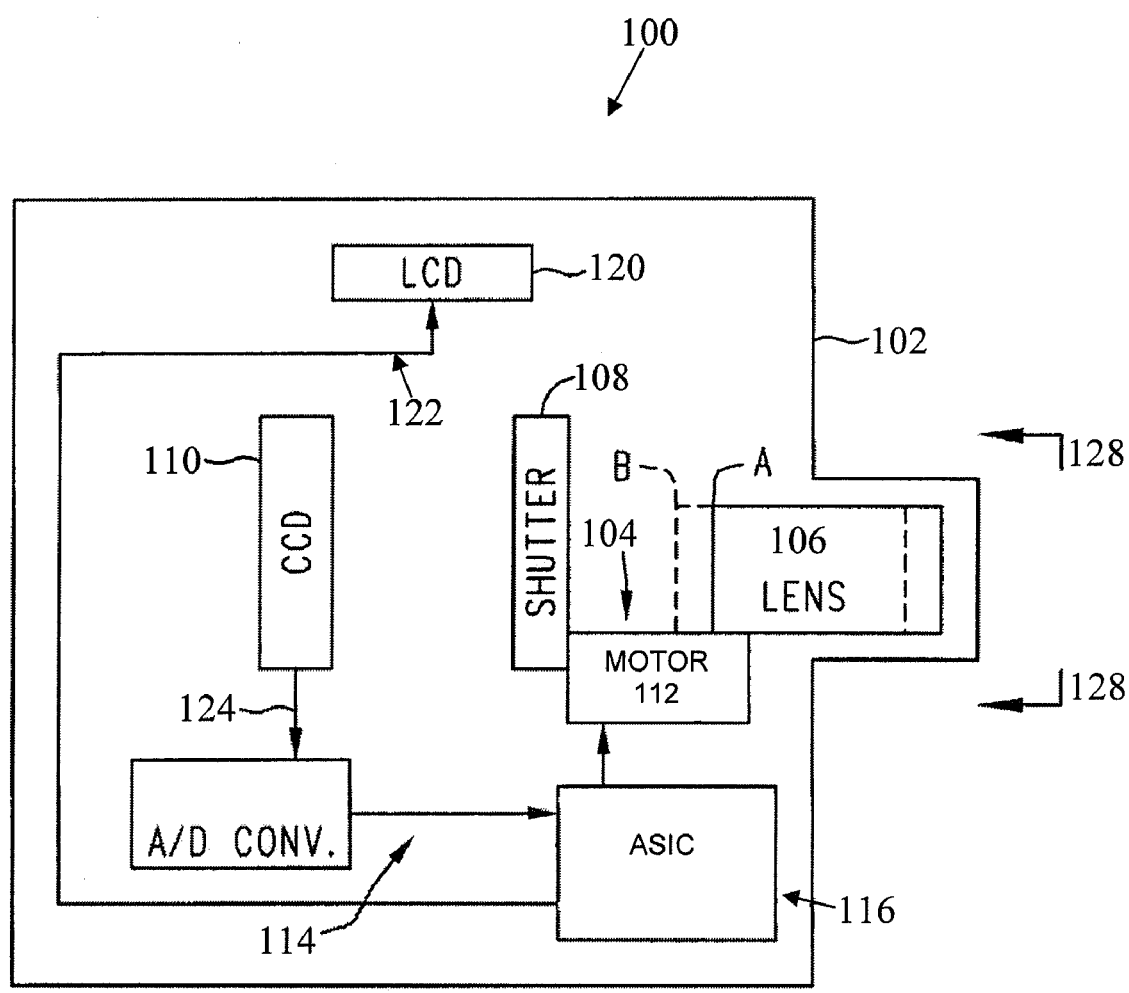
FIG. 1 provides a block diagram of a digital camera having an automated, extended depth-of-field mode.

FIG. 1 shows a diagrammatic representation of a digital camera 100 having an automated extended depth-of-field (EDOF) mode, according to the invention.

The digital camera 100 includes a housing 102, a lens shutter arrangement system 104 having a focusable lens 106 and a shutter 108, and an image-sensing device 110, such as a CCD (charge-coupled device). One embodiment may include a camera setting adjustment system 114. The camera setting adjustment system 114 may include a stepper motor 112 for incrementally adjusting the focus distance of the lens 106 and the size of the aperture opening. Additionally, the camera setting adjustment system may include an embedded system 116, the embedded system including at least one processor and a motor driver for facilitating incremental changes in focus distance and aperture via the stepper motor 112.

In one embodiment, the digital camera may include both fixed focus and auto-focus modes. Selection of focus mode may be accomplished by means of a switch (not shown) or by activating a focus mode-selection component in a user interface displayed on the LCD display 120. As shown in FIG. 1, the display is communicatively coupled to the embedded system 116 by means of leads 122.

An embodiment allows the user to specify the range of distances at the time of image capture. This may be done manually, for example, by selecting the defining distances via a pair of manual dials (not shown) or by selecting numerical values defining the range on the LCD display 120, or in a camera-assisted manner by using the camera's autofocus feature to specify the near and far limits of the range; for example by pointing a spot-metering range finder (within the autofocus system of the camera) at two or more points of interest. Additional embodiments may employ, for example, weighted average metering or forms of object-class detection such as face detection to specify near and far limits of the range. The camera then acquires a stack of images at spaced intervals sufficient to provide in-focus coverage across the desired range, wherein the processor of the embedded system is programmed to control the process of acquiring an image stack for creation of one or more EDOF images.

The foregoing description of an image capture apparatus is meant only to be illustrative and is not intended to be limiting. In light of the present description, the ordinarily-skilled practitioner will understand that other types of programmable image capture devices, for example, programmable film cameras, are entirely suitable for producing EDOF images by the process described herein.

As above, the embedded system 116 includes at least one processor. Additionally, the embedded system includes a read-only memory having stored therein one or more firmware modules for programming the at least one processor to execute the steps of a process for producing EDOF images as described herein.

In one embodiment, the embedded system may be composed of an ASIC (application specific integrated circuit) or one or more CMOSs (complementary metal oxide semiconductors). In other embodiments, the logic component of the embedded system may be a microcontroller programmed as below, or a FPGA (field programmable gate array) having logic circuits for performing the steps of the procedure below.

Figure 2:
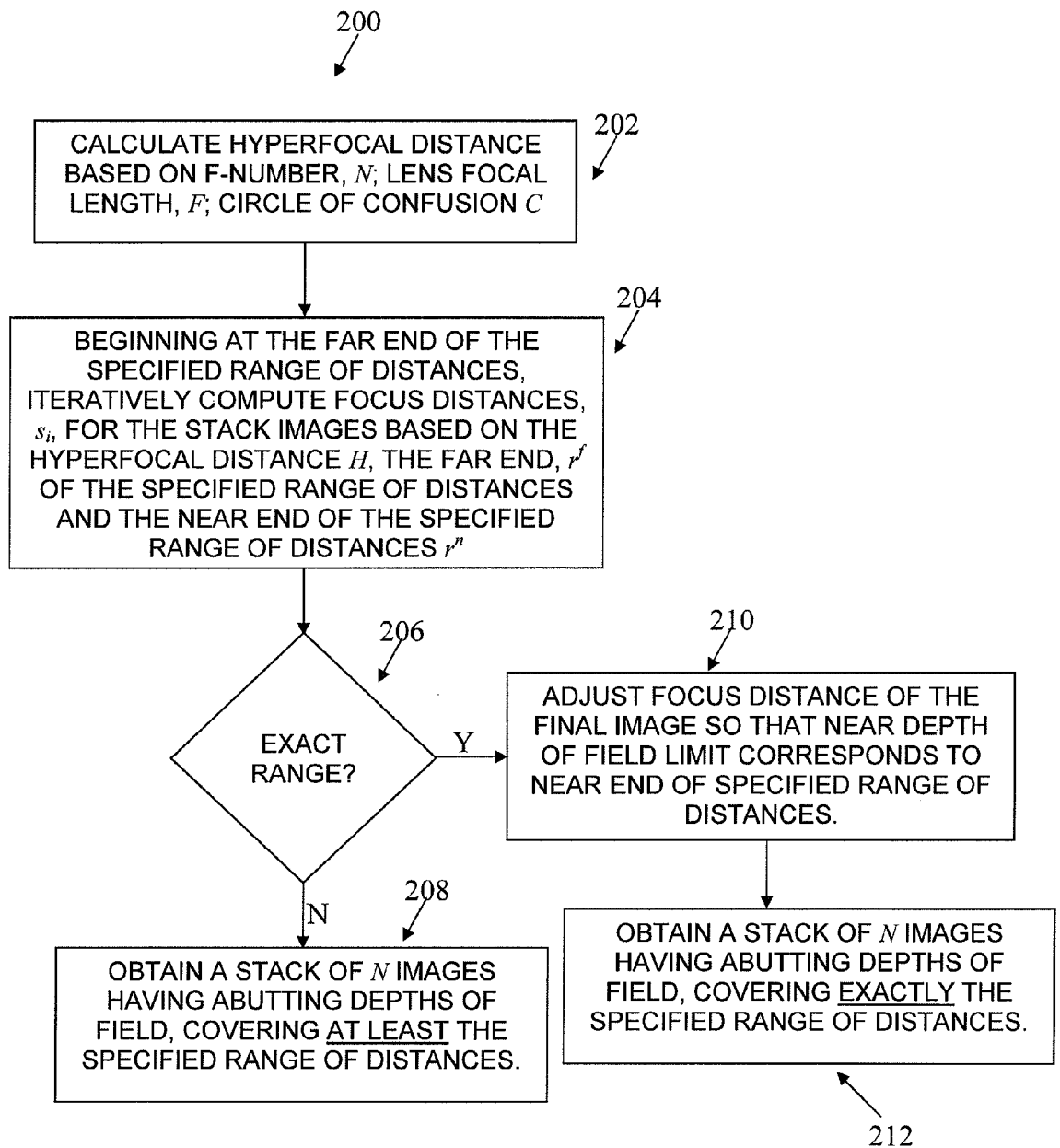
FIG. 2 provides a flow diagram of a method for acquiring a stack of images having depths of field that span a predetermined distance range for production of extended depth-of-field (EDOF) images.

Referring now to FIG. 2, acquisition of the image stack begins with the camera first approximating 202 the hyperfocal distance H:

$$H \approx \frac{f^2}{Nc} \quad (1)$$

based on the f-number, N, the lens focal length, f, and the maximum permissible circle of confusion c. The practitioner of ordinary skill will appreciate that, in the fields of optics and photography, hyperfocal distance is the closest distance at which the lens can be focused while keeping objects at infinity acceptably sharp. The ordinarily-skilled practitioner will understand that the maximum permissible circle of confusion is the largest circle of confusion considered to provide acceptably sharp focus.

Then, beginning at one end of the specified range of distances, the focus distances, $s_i$, for the stack images are computed iteratively based on approximations for the near and far limits—$D^n$ and $D^f$, respectively—of the depth of field:

$$D^n \approx \frac{Hs}{H+s} \quad (2)$$

and $$D^f \approx \frac{Hs}{H-s}. \quad (3)$$

For example, beginning at the far end of the specified range of distances, $r^f$, the initial focus distance is computed by solving for the focus distance in Equation 3 with $D^f = r^f$. That is, $$s_1 = \frac{Hr^f}{H+r^f}. \quad (4)$$

Then, the corresponding near depth of field limit is found using Equation 2, namely:

$$D_1^n = \frac{Hs_1}{H+s_1}. \quad (5)$$

The procedure is repeated with the near depth of field limit applied as the far limit of the depth of field in the next iteration. Specifically, $$s_i = \frac{HD_{i-1}^n}{H+D_{i-1}^n} \quad (6)$$

$$D_i^n = \frac{Hs_i}{H+s_i}, \quad (7)$$

with $D_0^n = r^f$. Substituting, the procedure can be summarized as $$s_1 = \frac{Hr^f}{H+r^f} \quad (8)$$

$$s_i = \frac{Hs_{i-1}}{H+2s_{i-1}}. \quad (9)$$

The iterative procedure continues until the near depth of field limit is within the near end of the specified range of distances. That is, iteration proceeds 204 until iteration N when $D_N^n \leq r^n$. Equivalently, this occurs when $$s_N \leq \frac{Hr^n}{H-r^n}. \quad (10)$$

The result of the procedure is a stack of N images having abutting depths of field, covering the specified range of distances.

Of course, it is unlikely that the final image is at a focus distance, $s_N$, with a near depth of field limit, $D_N^n$, corresponding to the near end of the specified range of distances, $r^n$. Most likely, the final image provides in-focus content nearer than $r^n$. An embodiment therefore preferably allows the user to specify whether he desires to have at least the specified range of distances in focus or exactly the specified range of distances in focus. Based on this specification 206, the final focus distance may be adjusted. In the former case, no adjustments need be made to the final focus distance. The result is a set of focus distances for a stack of images covering at least the specified range of distances. Based on this set of focus distances, the camera then obtains 208 a stack of N images having abutting depths of field, covering at least the specified range of distances. In the latter case, the final focus distance is adjusted such that the near depth of field limit corresponds to the near end of the specified range of distances 210, that is, $$s_{N'} = \frac{Hr^n}{H - r^n}. \quad (11)$$

The result is a set of focus distances for a stack of images having abutting depths of field covering exactly the specified range of distances. Based on this set of focus distances, the camera then obtains 212 a stack of N images having abutting depths of field, covering exactly the specified range of distances.

Alternatively, the images within the image stack may be acquired after each focus distance is calculated. In this embodiment, the adjustment step at block 210 may be performed by acquiring an additional image to replace the final image of the stack already acquired.

Example I

An exemplary calculation of focus distances according to the above procedure proceeds as follows:

A photographer operating a camera and f=35 mm lens at N=4.0 specifies a range of distances $r^n$=5 m and $r^f$=25 m. The camera images using a CCD sensor characterized by a circle of confusion of c=6 µm. Then, from Equation 1, H=51.04 m. Iterating according to Equations 8 and 9, the focus distances are determined to be $s_1$=16.78 m, $s_2$=10.12 m, $s_3$=7.25 m, $s_4$=5.65 m and $s_5$=4.62 m. Iteration ceases in accordance with Equation 10 with $s_5 \leq 5.54$ m. As noted above, the final focus distance, $s_5$, may optionally be adjusted according to Equation 11 to $s_5 = s_{N'} = 5.54$ m.

Figure 3:
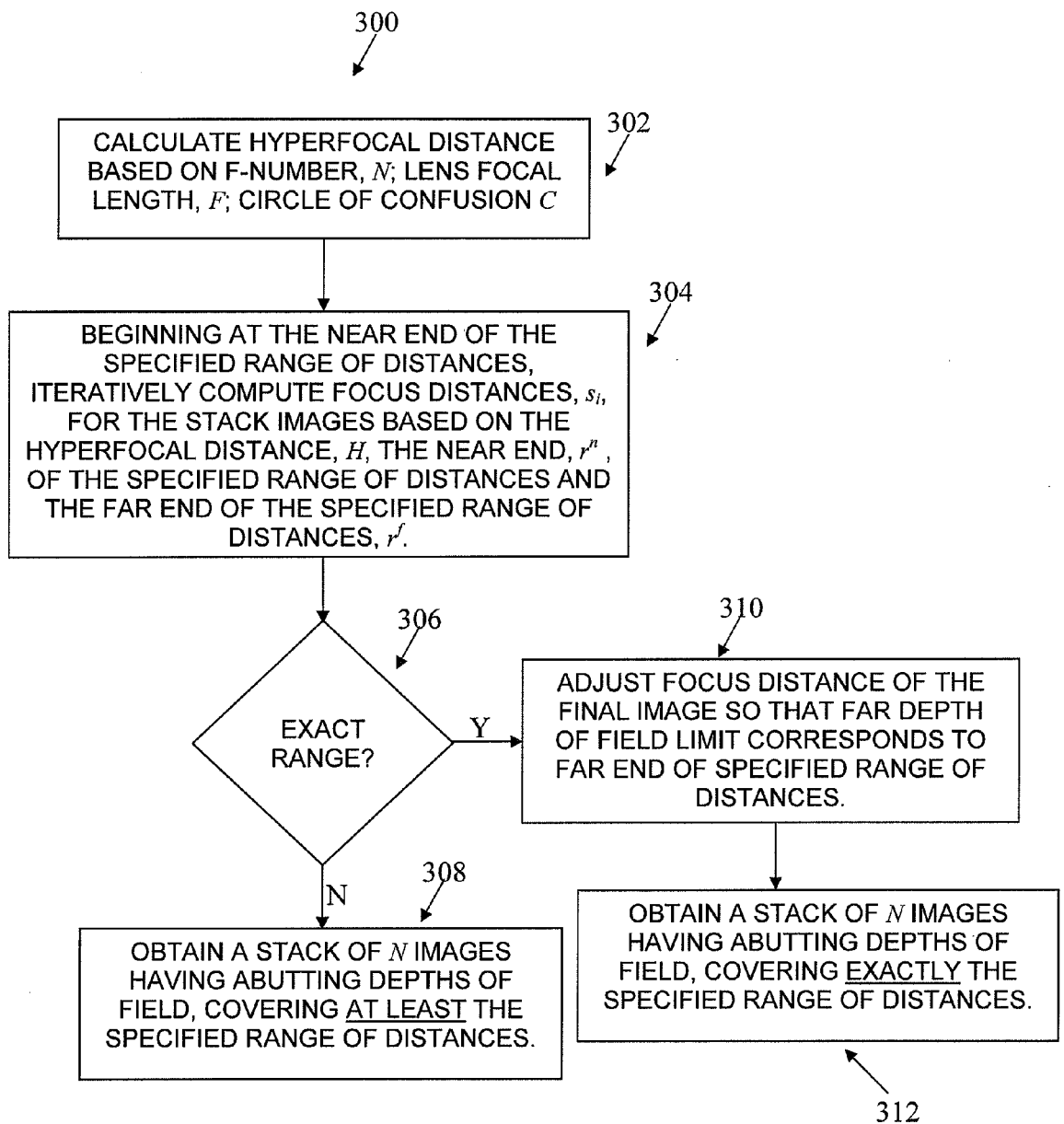
FIG. 3 provides a flow diagram of an alternate embodiment of a method for acquiring a stack of images having depths of field that span a predetermined distance range for production of EDOF images.

Alternatively, as shown in FIG. 3, it is possible to begin with the near end of the specified range of distances. In this approach, the procedure can be summarized as $$s_1 = \frac{Hr^n}{H - r^n} \quad (12)$$

$$s_i = \frac{Hs_{i-1}}{H - 2s_{i-1}}, \quad (13)$$

with termination upon $$s_N \geq \frac{Hr^f}{H + r^f}, \quad (14)$$

and optional adjustment of the final image to $$s_{N'} = \frac{Hr^f}{H + r^f}, \quad (15)$$

as previously described with respect to FIG. 1. If the user does not specify that the range of distances needs to be exact 306, the camera obtains 308 a stack of images covering at least the specified range results. If the user specifies that the range must be exact 306, the focus distance of the final image is adjusted 310 so that the far depth of field limit corresponds to far end of the specified range of distances, and the camera obtains 312 a stack of images covering exactly the specified range.

As with the process of FIG. 2, in an alternative embodiment, the images within the image stack may be acquired after each focus distance is calculated, and the adjustment step at block 310 may be performed by acquiring an additional image to replace the final image of the stack already acquired.

Example II

Again using the exemplary values of f=35 mm, N=4.0, $r^n$=5 m and $r^f$=25 m, and c=6 µm, and iterating according to Equations 12 and 13, the focus distances are determined to be $s_1$=5.54 m, $s_2$=7.08 m, $s_3$=9.80 m, $s_4$=15.91 m, and $s_5$=42.24 m. Iteration ceases in accordance with Equation 14 with $s_5 \geq 16.78$ m, and the final focus distance may optionally be adjusted according to Equation 15 to $s_5 = s_{N'} = 16.78$ m.

It is worth noting that the above procedures do allow the user to specify a range of distances in which $r^f = \infty$. In this case, in the inwardly-iterating procedure, the initial image is acquired at the hyperfocal distance. In the outwardly-iterating procedure, iteration is terminated when the focus distance exceeds the hyperfocal distance, and the focus distance of the final image is optionally adjusted back to the hyperfocal distance.

The procedures—in particular, the termination criterion in the inwardly iterating procedure and the initial image focus distance in the outwardly iterating procedure—do become indeterminate should a user specify a range of distances in which $r^n > H$. Such situations may be handled as special cases. For example, if the user requests that at least the specified range of distance be in focus, the camera can acquire a single image at a focus distance s=H. If the user requests that exactly the specified range of distance be in focus, a warning may be presented to the user prior to acquisition of a single image at s=H.

As can be seen, both the number and spacing of the stack images are dependent on the f-number. Preferably, the f-number is determined automatically by the camera using existing methods that consider, for example, the capabilities of the lens and the light level. However, the invention can also be used in conjunction with an aperture priority mode in which the user may specify a specific f-number at which the stack images are to be acquired. For example, a user willing to tolerate reduced sharpness in the composite image could reduce the number of stack images required by specifying a relatively small f-number. The system may also allow the user to specify specific f-numbers for the individual stack images, thus allowing customization of the stack image spacing.

Similarly, the number and spacing of stack images is dependent on the maximum permissible circle of confusion c. Preferably, the value of c is selected automatically by the camera, based on the inherent limitations, i.e. the optical quality, of the lens, the capabilities, i.e. the resolution, of the imaging format (e.g. 35 mm film, CCD), and the amount of diffraction associated with the chosen f-number. Alternatively, the circle of confusion may be specified by the user as desired. For example, a user willing to tolerate reduced sharpness in the composite image to reduce the number of stack images required could specify a relatively large maximum permissible circle of confusion.

In yet a further embodiment, the user can specify an overlap fraction, α of adjacent depths of field in the image stack. As in previous embodiments, hyperfocal distance and focus distances are calculated. In this case, however, the user specifies an overlap fraction. In this case, the procedures described herein above are modified such that the focus distance of each image within the image stack is adjusted to place one depth of field limit within the previous depth of field. For example, in the inwardly-iterating procedure, the focus distance (Equation 6) is adjusted to $$s_i = \frac{HD_i^f}{H + D_i^f} \quad (16)$$

where the far depth of field limit is within the previous depth of field as specified by α, namely, $$D_i^f = D_{i-1}{}'' + \alpha(D_{i-1}^f - D_{i-1}{}''). \quad (17)$$

Application of the overlap fraction results in a stack of images having overlapping depths of field. In the absence of an overlap fraction, a stack of images having abutting depths of field results.

Example III

Returning to the example above, with an overlap fraction of α=0.2, Equations 16 and 17 yield focus distances of $s_1$=16.78 m, $s_2$=11.65 m, $s_3$=8.78 m, $s_4$=7.00 m, $s_5$=5.81 m, and $s_6$=4.95 m and depths of field $[D_1'',D_1^f]$=[12.63 m, 25.00 m], $[D_2'',D_2^f]$=[9.49 m, 15.10 m], $[D_3'',D_3^f]$=[7.49 m, m, 10.61 m], $[D_4'',D_4^f]$=[6.16 m, 8.12 m], $[D_5'',D_5^f]$=[5.21 m, 6.55 m], and $[D_6'',D_6^f]$=[4.51 m, 5.48 m].

A still further embodiment extends to multiple ranges of distance that the user wishes to have in focus. In this embodiment, each range can be handled separately, as described above.

In yet another embodiment, the user can specify one or more ranges of distances that he wishes to be out of focus. In this case, the out of focus ranges can be converted to one or more complementary in focus ranges, each handled as described above.

Finally, in yet another embodiment, the camera automatically acquires a stack of images providing coverage from the near field to infinity at an extremely small f-number. Because each image within the stack offers a limited depth of field, it is then possible for the photographer to select, in post-processing software, what distances he would like to have in focus and what regions he would like to have out of focus. Based on the metadata saved by the camera for each image within the stack, the post-processing software assembles the composite image from the appropriate images within the stack. This approach does require the capture and storage of more stack images than may ultimately be utilized, but it does provide the photographer with greater artistic freedom later in the production process.

Finally, the ordinarily-skilled practitioner will appreciate that the expression in Equation 1 is only one possible approximation of the hyperfocal distance, and the expressions of Equations 2 and 3 are only two possible approximations of the limits of the depth of field. In particular, these approximations are valid only for relatively large focus distances in which s>>f. Especially in the case of extremely close subject matter, such as in macrophotography, the depth of field may be calculated by any number of well known alternative approximations, and different approximations may be used at different focus distances; in other words, different images within the stack.

The above procedures are preferably invoked by the user via selection of an auto-EDOF mode, analogous to shutter priority or program modes found on many cameras. For example, the user may select the mode on a rotary dial atop the camera. After selection of the mode and specification of the range of distances, the stack of images is preferably acquired as rapidly as possible in response to a single press of the shutter button. In the case of an SLR (single lens reflex) camera, the reflex mirror may be held in a retracted position while the images are acquired. In the case of a digital camera, the images may be written to a temporary memory cache offering faster write times than the permanent memory, enabling faster image acquisition. Nonetheless, as the stack images are still acquired over a span of time, the invention may be combined with any of several well-known techniques for digital image stabilization that are capable of backing out any motion of the subject or camera that occurs between successive images within the stack; for example the image stack feature within PHOTOSHOP (ADOBE SYSTEMS, INC., San Jose, Calif.) or such image-processing software as HELICON FOCUS (HELICON SOFTWARE, LTD., Kharkov, Ukraine).

As noted above, the stack of images is combined into a single composite image during post-acquisition processing. In one embodiment, the processing is performed off-board the camera by a computational device programmed with an image processing software application for creating extended depth of field images. Examples of such software applications are COMBINEZ5 and COMBINEZM, both open-source programs obtainable on the Internet, and both originally developed by Alan Hadley, a resident of the United Kingdom. To better facilitate post-processing operations, the camera saves metadata with each image in the stack, preferably indicating the inner and outer boundaries of the depth of field for the image and the specified range of distances. At a minimum, the camera stores information from which these quantities can be determined, for example the f-number, the lens focal length, and the maximum possible circle of confusion. The information is preferably stored in a standardized set of meta-data tags, such as those within the Exchangeable Image File Format (EXIF).

In a further embodiment, the images may be combined into a single composite image onboard the camera. In this case, the stack images may be deleted after composition to increase available memory space.

The methods and systems herein described provide a large number of unexpected benefits which render them a great advance over the conventional manner of producing extended depth of field images. The foremost advantage provided by present methods and systems is that they provide an integrated solution to the challenge of producing extended depth of field (EDOF) images. Presently, practitioners in this art must first acquire the images, largely, manually. The practitioner determines the depth of field boundaries and the corresponding depths of field at which it is necessary to acquire images in order to cover the desired range of distances. After acquiring the image stack, the practitioner must then export the image stack to a third-party software application with which the composite, extended depth of field image is created.

The integrated solution provided by the present systems and methods greatly increases the ease with which such images may be produced. Until now, EDOF image production presented a formidable technical challenge requiring a high level of skill in the operation of imaging equipment, the integrated solution described herein reduces the level of required technical skill to approximately that required to operate a digital camera.

The present solution greatly simplifies the step of defining the focus range for the EDOF image, substituting a simple, intuitive procedure whereby the user defines the focus range by tagging successive focus points using the autofocus feature of a digital camera for the cumbersome manual procedure now generally used.

The present solution also greatly simplifies the acquisition of the image stack. The system intelligently calculates the required depths of field to cover the specified range of distances and automatically acquires the image stack, with little or no additional user input. One embodiment integrates the production of the EDOF image, eliminating the need for yet another software application to produce the image, and greatly reducing the storage and transfer bandwidth requirements involved in EDOF image production.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A system for extended depth-of-field imaging, comprising:
   an imaging apparatus;
   at least one processing element integrated on the imaging apparatus; and
   storage means embodying program logic for iteratively computing a focus distance for each stack image within at least one stack of images based on a hyperfocal distance and the near and far limits of at least one specified range of distances until at least the specified range of distances is covered, and
   automatically acquiring each stack image at said focus distance, wherein execution of the program logic by the at least one processing element causes the system to compute the focus distances and acquire the at least one stack of images covering the at least one specified range of distances.

2. The system of claim 1, wherein said imaging apparatus comprises either a digital camera or a film camera.

3. The system of claim 1, further comprising a control element that enables a user to specify the range of distances, the control element comprising means for any of:
   specifying the at least one range of distances directly; and
   specifying boundaries of at least one out-of-focus range of distances, wherein an inverse of the at least one out-of-focus range of distances comprises the at least one specified range of distances.

4. The system of claim 3, wherein the control element is operative to enable the user to specify the at least one range of distances either before or after image acquisition.

5. The system of claim 3, wherein the control element is selected from the group consisting of: one or more mechanical elements by which the user specifies near and far distances defining the at least one range of distances;
   an integrated user interface wherein the user specifies the near and far distances defining the at least one range of distances by interacting with one or more elements within the user interface; and
   an auto-focus system integrated within the apparatus that includes means for the user to specify the at least one range of distances by pointing a range finder at successive points of interest.

6. The system of claim 1, further comprising storage means embodying program logic for creating at least one composite, extended depth-of-field image from at least a portion of the at least one stack of images.

7. The system of claim 6, wherein execution of the program logic for creating the at least one composite, extended depth-of-field image by either the processing element integrated on the imaging apparatus or a processing element external to the imaging apparatus causes the system to create the at least one extended depth-of-field image from at least a portion of the at least one stack of images.

8. The system of claim 1, wherein a user is enabled to specify that the user wants to have exactly the specified range of distances in focus.

9. The system of claim 8, further comprising storage means embodying program logic for adjusting the focus distance of a terminal image in the range of distances so that a depth of field limit for the terminal image corresponds to a specified limit of the specified range of distances.

10. The system of claim 1, further comprising storage means embodying program logic for any of:
    automatically determining f-number based on lens capabilities and light level; and
    automatically selecting a maximum permissible circle of confusion.

11. The system of claim 1, wherein each of the depths of field covering at least one specified range of distances either overlap an adjacent depth of field or abut at least one adjacent depth of field.

12. The system of claim 1, further comprising at least one selected from a group consisting of:
    control means for the user to specify a specific f-number at which stack images are to be acquired;
    control means to specify specific f-numbers for individual stack images; and
    control means to specify a maximum permissible circle of confusion.

13. The system of claim 1, further comprising:
    selection means enabling the user to select an auto-EDOF mode from a plurality of modes, wherein acquisition of the stack of images proceeds automatically after shutter activation.

14. The system of claim 1, further comprising retraction means for retracting a reflex mirror during image acquisition.

15. The system of claim 1, further comprising a temporary cache offering faster write times than permanent memory, enabling faster image acquisition.

16. The system of claim 1, further comprising a processor programmed to stabilize acquired images to compensate for subject or camera movement during image acquisition.

17. A system for extended depth-of-field imaging comprising:
    an imaging apparatus;
    means integrated on the imaging apparatus for iteratively computing a focus distance for each stack image within at least one stack of images based on a hyperfocal distance and the near and far limits of at least one specified range of distances until at least the specified range of distances is covered and for automatically acquiring the at least one stack of images having depths of field covering the at least one specified range of distances.

18. The system of claim 17, further comprising:
means for creating at least one composite, extended depth-of-field image from at least a portion of the at least one stack of images.

19. A method of operating an apparatus for extended depth-of-field imaging comprising the steps of:
upon activation of a control element, at least one processing element within the apparatus for extended depth-of-field imaging executing stored program logic for automatically acquiring at least one stack of images having depths of field covering at least one specified range of distances;
responsive to the step of executing the stored program logic, the apparatus for extended depth-of-field imaging performing the steps of:
iteratively computing a focus distance for each stack image based on hyperfocal distance and the near and far limits of the specified range of distances until at least the specified range of distances is covered; and
automatically acquiring the stack of images having depths of field covering at least said specified range of distances.

20. The method of claim 19, further comprising either of the steps of: a user specifying the at least one range of distances directly, either before or after image acquisition; and
the user specifying boundaries of at least one out-of-focus range of distances, either before or after image acquisition, wherein an inverse of the at least one out-of-focus range of distances comprises the at least one specified range of distances.

21. The method of claim 19, wherein the apparatus comprises either a digital camera or a filth camera.

22. The method of claim 19, further comprising the step of: automatically creating at least one composite, extended depth-of-field image from at least a portion of the at least one stack of images.

23. The method of claim 19, further comprising the step of: the user specifying that the user wants to have exactly the specified range of distances in focus.

24. The method of claim 23, further comprising the step of: automatically adjusting the focus distance of a terminal image in the range of distances so that a depth of field limit for the terminal image corresponds to a specified limit of the specified range of distances.

25. The method of claim 19, further comprising the steps of: automatically determining f-number based on lens capabilities and light level; and
automatically selecting a maximum permissible circle of confusion.

26. The method of claim 19, further comprising at least one step selected from a group consisting of:
a user specifying a specific f-number at which stack images are to be acquired;
the user specifying specific f-numbers for individual stack images; and the user specifying a maximum permissible circle of confusion.

27. The method of claim 19, further comprising the step of: a user selecting an auto-EDOF mode from a plurality of modes, wherein acquisition of the stack of images proceeds automatically after shutter activation.

28. The method of claim 19, further comprising the step of: stabilizing acquired images to compensate for subject or camera movement during image acquisition.

* * * * *